United States Patent
Comte et al.

(10) Patent No.: US 10,407,339 B2
(45) Date of Patent: Sep. 10, 2019

(54) ION EXCHANGEABLE SOFT GLASSES FOR THREE-DIMENSIONAL SHAPES

(71) Applicant: CORNING INCORPORATED, Corning, NY (US)

(72) Inventors: Marie Jacqueline Monique Comte, Fontenay aux Roses (FR); Robert Michael Morena, Lindley, NY (US); Charlene Marie Smith, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 233 days.

(21) Appl. No.: 15/052,971

(22) Filed: Feb. 25, 2016

(65) Prior Publication Data
US 2016/0251256 A1    Sep. 1, 2016

Related U.S. Application Data

(60) Provisional application No. 62/121,016, filed on Feb. 26, 2015.

(51) Int. Cl.
| | |
|---|---|
| *C03C 3/093* | (2006.01) |
| *C03C 3/097* | (2006.01) |
| *C03C 21/00* | (2006.01) |
| *B32B 17/00* | (2006.01) |
| *C03C 4/18* | (2006.01) |
| *C03C 3/085* | (2006.01) |

(52) U.S. Cl.
CPC .............. *C03C 3/097* (2013.01); *B32B 17/00* (2013.01); *C03C 3/085* (2013.01); *C03C 3/093* (2013.01); *C03C 4/18* (2013.01); *C03C 21/002* (2013.01); *B32B 2250/02* (2013.01); *B32B 2457/20* (2013.01); *C03C 2204/00* (2013.01)

(58) Field of Classification Search
None
See application file for complete search history.

(56) References Cited

U.S. PATENT DOCUMENTS

| | | | |
|---|---|---|---|
| 3,954,487 A * | 5/1976 | Gliemeroth | ............. C03C 3/093 428/410 |
| 7,666,511 B2 | 2/2010 | Ellison et al. | |
| 8,349,454 B2 | 1/2013 | Murata et al. | |
| 8,460,018 B2 | 6/2013 | Henry et al. | |

(Continued)

FOREIGN PATENT DOCUMENTS

| | | | |
|---|---|---|---|
| JP | 2008115071 | 5/2008 | |
| WO | WO-2014208112 A1 * | 12/2014 | ............. C03C 3/093 |

OTHER PUBLICATIONS

International Search Report of the International Searching Authority; PCT/US2016/019668; dated Jun. 28, 2016.

(Continued)

*Primary Examiner* — David Sample
(74) *Attorney, Agent, or Firm* — Kevin M. Johnson

(57) ABSTRACT

Ion exchangeable alkali aluminosilicate glasses and glass articles having softening points and high temperature coefficients of thermal expansion that permit the glass to be formed into three-dimensional shapes by the vacuum sagging process are provided. These glasses contain significant amounts of at least one of MgO and ZnO and comprise $B_2O_3$ and less than 1 mol % $Li_2O$.

34 Claims, 2 Drawing Sheets

(56) References Cited

U.S. PATENT DOCUMENTS

| | | | |
|---|---|---|---|
| 9,975,803 B2* | 5/2018 | Gross | C03C 3/097 |
| 2010/0035745 A1* | 2/2010 | Murata | C03C 3/083 |
| | | | 501/66 |
| 2010/0119846 A1* | 5/2010 | Sawada | C03B 33/023 |
| | | | 428/426 |
| 2011/0294648 A1 | 12/2011 | Chapman et al. | |
| 2012/0297829 A1* | 11/2012 | Endo | C03C 3/085 |
| | | | 65/30.14 |
| 2013/0004758 A1* | 1/2013 | Dejneka | C03C 3/087 |
| | | | 428/220 |
| 2014/0023865 A1 | 1/2014 | Comte et al. | |
| 2014/0170380 A1 | 6/2014 | Murata et al. | |
| 2014/0186632 A1* | 7/2014 | Dejneka | C03C 3/083 |
| | | | 428/410 |
| 2015/0239770 A1 | 8/2015 | Gross | |
| 2017/0129218 A1* | 5/2017 | Cleary | B32B 17/06 |

OTHER PUBLICATIONS

English Translation of TW105105899 Office Action and Search Report dated Jun. 5, 2019, Taiwan Patent Office, 2 Pgs.

* cited by examiner

ION EXCHANGEABLE SOFT GLASSES FOR THREE-DIMENSIONAL SHAPES

This application claims the benefit of priority under 35 U.S.C. § 119 of U.S. Provisional Application Ser. No. 62/121,016 filed on Feb. 26, 2015 the content of which is relied upon and incorporated herein by reference in its entirety.

BACKGROUND

The disclosure relates to alkali aluminosilicate glasses that have low softening points. More particularly, the disclosure relates to such glasses that are ion exchangeable and formable into three-dimensional shapes.

Ion exchangeable glasses are widely used as cover glass for displays found in many modern electronic devices, including hand-held devices. However, the use of these chemically-strengthenable glasses in such applications has been limited to devices that are, for the most part, flat and planar. The formation of three-dimensional (3D) glass shapes is sometimes achieved by molding and/or sagging process in which the glass is heated and allowed to sag under gravity or vacuum into a mold to obtain its final or near-final shape. Many ion-exchangeable glasses, however, have softening points that are so high that they tend to react with, stick to, and/or degrade the molds used for the sagging process, even when a protective mold coating is employed.

Lithium-containing alkali aluminosilicate glasses tend to have lower softening points, but limit the ion exchange properties of the glass when sodium in the glass is exchanged for potassium in the ion exchange medium. In order to achieve the desired depth of the resulting compressive layer (depth of layer, or DOL), such glasses must typically be ion exchanged at higher temperatures and for longer times which, from a manufacturing standpoint, are not practical or desirable. In addition, the level of compressive stress (CS) decreases with longer ion exchange times. Even when ion exchanged for long periods of time, the depth of the compressive layer tends to be relatively shallow.

SUMMARY

Ion exchangeable alkali aluminosilicate glasses and glass articles that have softening points and high temperature coefficients of thermal expansion that permit the glass to be formed into three-dimensional shapes by the vacuum sagging process are provided. These glasses contain significant amounts of at least one of MgO and ZnO and comprise $B_2O_3$ and less than 1 mol % $Li_2O$.

Accordingly, one aspect of the disclosure is to provide an alkali aluminosilicate glass comprising from about 0.5 mol % to about 4 mol % $B_2O_3$, less than 1 mol % $Li_2O$, and from about 1 mol % to about 7 mol % ZnO. The alkali aluminosilicate glass has a softening point of about 790° C. or less and a high temperature coefficient of thermal expansion of about $35\times10^{-6}$ $K^{-1}$ or less. The glass is ion exchangeable and formable into a three-dimensional non-planar shape.

A second aspect of the disclosure is to provide a alkali aluminosilicate glass comprising: from about 62 mol % to about 70 mol % $SiO_2$; from about 5 mol % to about 11 mol % $Al_2O_3$; from about 0.5 mol % to about 4 mol % $B_2O_3$; from 0 mol % to about 1 mol % $Li_2O$; from about 13 mol % to about 19 mol % $Na_2O$; from about 0.3 mol % to about 4 mol % $K_2O$; from 0 mol % to about 6 mol % MgO; and from about 1 mol % to about 7 mol % ZnO. The glass has a softening point of about 790° C. or less and a high temperature coefficient of thermal expansion of about $35\times10^{-6}$ $K^{-1}$ or less.

These and other aspects, advantages, and salient features of the present disclosure will become apparent from the following detailed description, the accompanying drawings, and the appended claims.

DETAILED DESCRIPTION

Figure 1:
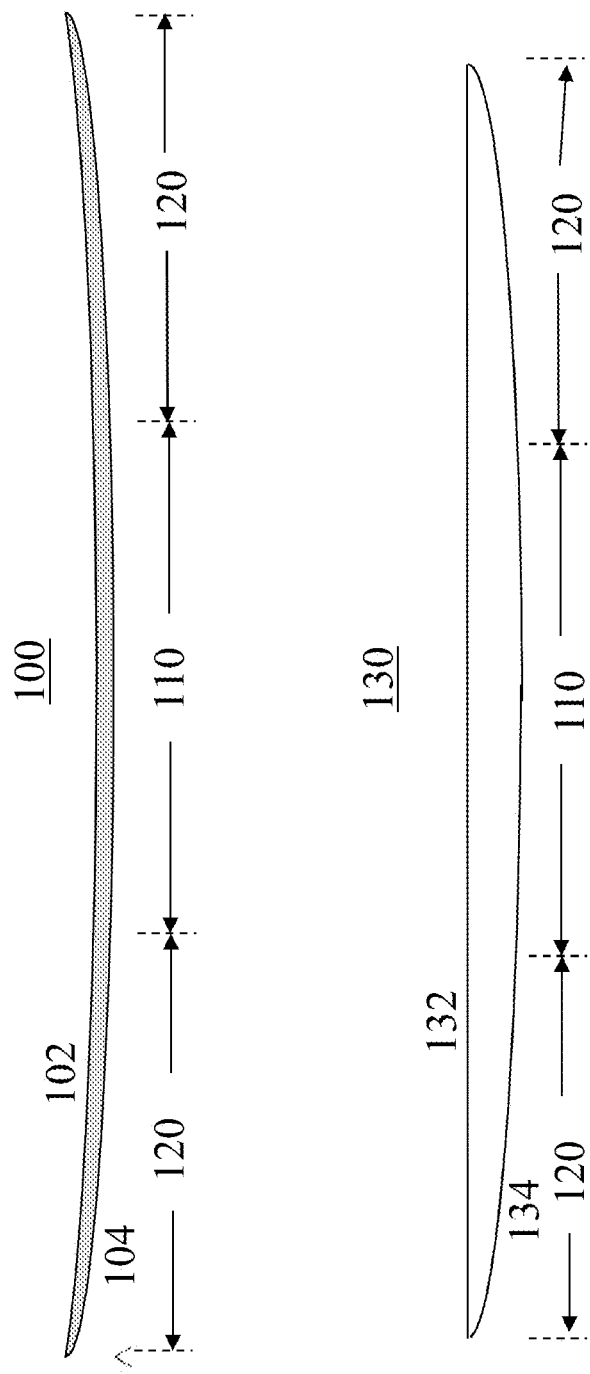
FIG. 1 is a cross-sectional schematic view of dish-shaped glass articles.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever an object, article, or composition is described as comprising at least one of a group of elements and combinations thereof, it is understood that the group may comprise, consist essentially of, or consist of any number of those elements recited, either individually or in combination with each other. Similarly, whenever an object, article, or composition is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

Unless otherwise specified, all compositions are expressed in terms of mole percent (mol %). High temperature coefficients of thermal expansion (high temperature CTE) are expressed in terms of part per million (ppm) per degree Kelvin (ppm·$K^{-1}$ or $10^{-6}K^{-1}$), and represent a value measured in the high temperature plateau region of the instantaneous coefficient of thermal expansion (CTE) vs. temperature curve. The high temperature CTE measures the volume change associated with heating or cooling of the glass through the transformation region. It is thought that high CTE values lead to high warp after forming.

In isoviscous processes such as fusion, the highest temperature experienced by the glass corresponds to a particular viscosity of the glass. As used herein, the term "liquidus viscosity" refers to the viscosity of the glass or glass melt at which crystals first appear as a molten alkali aluminosilicate glass cools down from the melting temperature, or the temperature at which the very last crystals melt away as temperature is increased from room temperature. The glasses described herein have a zircon breakdown temperature that is equal to the temperature at which the viscosity of the glass is equal to the 30 kP zircon breakdown viscosity. As used herein, the term "200 poise temperature" or "$T^{200}$" refers to the temperature at which the alkali aluminosilicate glass or alkali aluminosilicate glass melt has a viscosity of 200 Poise (P).

As used herein, "softening point" refers to the viscosity at which a glass object will sag under its own weight and is defined as the temperature at which the viscosity of the glass is $10^{7.6}$ Poise (P).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, an alkali aluminosilicate glass that is "substantially free of $Li_2O$" is one in which $Li_2O$ is not actively added or batched into the alkali aluminosilicate glass, but may be present in very small amounts (i.e., <0.1 mol %) as a contaminant. "Lithium-free" means that the glass contains 0 mol % Li and/or $Li_2O$.

Compressive stress and depth of layer are measured using those means known in the art. Such means include, but are not limited to, measurement of surface stress (FSM) using commercially available instruments such as the FSM-6000, manufactured by Luceo Co., Ltd. (Tokyo, Japan), or the like. Methods of measuring compressive stress and depth of layer are described in ASTM 1422C-99, entitled "Standard Specification for Chemically Strengthened Flat Alkali alumino-silicate glass," and ASTM 1279.19779 "Standard Test Method for Non-Destructive Photoelastic Measurement of Edge and Surface Stresses in Annealed, Heat-Strengthened, and Fully-Tempered Flat Alkali aluminosilicate glass," the contents of which are incorporated herein by reference in their entirety. Surface stress measurements rely upon the accurate measurement of the stress optical coefficient (SOC), expressed in nm/cm·MPa), which is related to the birefringence of the alkali aluminosilicate glass when placed under stress or load. SOC in turn is measured by those methods that are known in the art, such as fiber and four point bend methods, both of which are described in ASTM standard C770-98 (2008), entitled "Standard Test Method for Measurement of Alkali aluminosilicate glass Stress-Optical Coefficient," the contents of which are incorporated herein by reference in their entirety, and a bulk cylinder method.

Referring to the drawings in general and to FIG. 1 in particular, it will be understood that the illustrations are for the purpose of describing particular embodiments and are not intended to limit the disclosure or the claims appended thereto. The drawings are not necessarily to scale, and certain features and certain views of the drawings may be shown exaggerated in scale or in schematic in the interest of clarity and conciseness.

Ion exchangeable glasses are widely used as cover glass for displays found in many modern electronic devices including hand-held devices. However, the use of these chemically-strengthenable glasses in such applications has been limited to articles or devices that are, for the most part, flat and planar. The sagging process is widely used to form three-dimensional (3D) glass shapes. in this process, glass is heated and allowed to sag into a mold under its own weight or under a vacuum to obtain a final or near-final shape. Many ion-exchangeable glasses, however, tend to react with, stick to, and/or degrade the molds used for the sagging process, even when a protective mold coating is employed. There is therefore a need for ion-exchangeable glasses having sufficiently low softening range viscosities or softening points to allow complex 3D shapes to be formed by sagging processes.

Lithium-containing alkali aluminosilicate glasses tend to have lower softening points. The presence of lithium, however, limits the ion exchange properties of the glass when sodium in the glass is exchanged for potassium in the ion exchange medium. In order to achieve a desired depth of the resulting compressive layer (depth of layer, or DOL), such glasses must typically be ion exchanged at higher temperatures and longer times which, from a manufacturing standpoint, are not practical or desirable. Even when ion exchanged for long periods of time, the resulting depth of the compressive layer tends to be relatively shallow and the compressive stress is low.

Accordingly, described herein are ion exchangeable alkali aluminosilicate glasses (also referred to hereinafter simply as "glass") and glass articles that have softening points and high temperature coefficients of thermal expansion that permit the glass to be formed into 3D shapes by the vacuum sagging process. These glasses contain significant amounts (i.e., ≥1 mol %) of at least one of MgO and ZnO and comprise from about 0.5 mol % to about 4 mol % $B_2O_3$, less than 1 mol % $Li_2O$, and from about 1 mol % to about 7 mol % ZnO, wherein the alkali aluminosilicate glass has a softening point of less than about 790° C. and a high temperature coefficient of thermal expansion of about $35 \times 10^{-6}$ $K^{-1}$ or less. In some embodiments, the glasses have a 200 Poise temperature ($T^{200P}$) of less than about 1620° C.

In some embodiments, the alkali aluminosilicate glass comprises: from about 62 mol % to about 70 mol % $SiO_2$ (i.e., 62 mol %≤$SiO_2$≤70 mol %); from about 5 mol % to about 11 mol % $Al_2O_3$ (i.e., 5 mol %≤$Al_2O_3$≤11 mol %); from about 0.5 mol % to about 4 mol % $B_2O_3$ (i.e., 0.5 mol %≤$B_2O_3$≤4 mol %); from 0 mol % to less than 1 mol % $Li_2O$ (i.e., 0 mol %≤$Li_2O$<1 mol %); from about 13 mol % to about 19 mol % $Na_2O$ (i.e., 13 mol %≤$Na_2O$≤19 mol %); from about 0.3 mol % to about 4 mol % $K_2O$ (i.e., 0.3 mol %≤$K_2O$≤4 mol %); from 0 mol % to about 6 mol % MgO (i.e., 0 mol %≤MgO≤6 mol %); and from about 1 mol % to about 7 mol % ZnO (i.e.; 1 mol %≤ZnO≤7 mol %).

In certain embodiments, the alkali aluminosilicate glass comprises: from about 64 mol % to about 67 mol % $SiO_2$ (i.e., 64 mol %≤$SiO_2$≤67 mol %); from about 5 mol % to about 10 mol % $Al_2O_3$ (i.e., 5 mol %≤$Al_2O_3$≤10 mol %); from about 0.5 mol % to about 4 mol % $B_2O_3$ (i.e., 0.5 mol %≤$B_2O_3$≤4 mol %); 0 mol % $Li_2O$; from about 13 mol % to about 17 mol % $Na_2O$ (i.e., 13 mol %≤$Na_2O$≤17 mol %); from about 1 mol % to about 4 mol % $K_2O$ (i.e., 1 mol %≤$K_2O$≤4 mol %); from 0 mol % to about 6 mol % MgO (i.e., 0 mol %≤MgO≤6 mol %); and from about 1 mol % to about 7 mol % ZnO (i.e.; 1 mol %≤ZnO≤7 mol %).

In some embodiments, the alkali aluminosilicate glass comprises: from about 64 mol % to about 67 mol % $SiO_2$ (i.e., 64 mol %≤$SiO_2$≤67 mol %); from about 5 mol % to about 10 mol % $Al_2O_3$ (i.e., 5 mol %≤$Al_2O_3$≤10 mol %); from about 0.5 mol % to about 4 mol % $B_2O_3$ (i.e., 0.5 mol %≤$B_2O_3$≤4 mol %); 0 mol % $Li_2O$; from about 13 mol % to about 17 mol % $Na_2O$ (i.e., 13 mol %≤$Na_2O$≤17 mol %); from about 1 mol % to about 4 mol % $K_2O$ (i.e., 1 mol %≤$K_2O$≤4 mol %); from 0.5 mol % to about 6 mol % MgO (i.e., 0.5 mol %≤MgO≤6 mol %); and from about 4 mol % to about 7 mol % ZnO (i.e.; 4 mol %≤ZnO≤7 mol %).

In some embodiments, the alkali aluminosilicate glass comprises: from about 62 mol % to about 70 mol % $SiO_2$ (i.e., 62 mol %≤$SiO_2$≤70 mol %); from about 5 mol % to about 11 mol % $Al_2O_3$ (i.e., 5 mol %≤$Al_2O_3$≤11 mol %); from about 0.5 mol % to about 2.5 mol % $B_2O_3$ (i.e., 0.5 mol %≤$B_2O_3$≤4 mol %); 0 mol % $Li_2O$; from about 15 mol % to about 19 mol % $Na_2O$ (i.e., 15 mol %≤$Na_2O$≤19 mol %); from about 0.3 mol % to about 4 mol % $K_2O$ (i.e., 0.3 mol %≤$K_2O$≤4 mol %); from 0 mol % to about 6 mol % MgO (i.e., 0 mol %≤MgO≤6 mol %); and from about 1 mol % to about 7 mol % ZnO (i.e.; 1 mol %≤ZnO≤7 mol %).

The above glasses may, in some embodiments, further comprise from 0 mol % to about 3 mol % $P_2O_5$ (i.e., 0 mol %≤$P_2O_5$≤3 mol, and/or from 0 mol % to about 4 mol % $ZrO_2$ (i.e., 0 mol %≤$ZrO_2$≤4 mol %). Also, these glasses may further comprise up to about 0.5 mol % of at least one fining agent such as, but not limited to, $SnO_2$, $Sb_2O_3$, and the like. In some embodiments, the glasses described herein are free of at least one of lithium, barium, arsenic, and antimony.

Each of the oxide components of the glasses described herein serves a function. Silica ($SiO_2$), for example, is the primary glass forming oxide, forming the network backbone for the molten glass. Pure $SiO_2$ has a low CTE and is alkali metal-free. Due to its extremely high melting temperature, however, pure $SiO_2$ is incompatible with the fusion draw process. The $SiO_2$ viscosity curve is also much too high to match with any core glass in a laminate structure. In some embodiments, the glasses described herein comprise from about 62 mol % to about 70 mol % $SiO_2$, and, in other embodiments, from about 64 mol % to about 67 mol % $SiO_2$.

In addition to silica, the glasses described herein comprise the network formers $Al_2O_3$ and $B_2O_3$ to achieve stable glass formation, low CTE, low Young's modulus, low shear modulus, and to facilitate melting and forming. Like $SiO_2$, $Al_2O_3$ contributes to the rigidity to the glass network. Alumina can exist in the glass in either fourfold or fivefold coordination. In order to achieve a sufficient depth of layer during ion exchange, the amount of $Al_2O_3$ in the glass must be greater than 5 mol %. If the alumina content exceeds 12 mol %, however, the softening point is too high to form 3D shapes. In some embodiments, the glasses described herein comprise from about 5 mol % to about 11 mol % $Al_2O_3$ and, in particular embodiments, from about 5 mol % to about 10 mol % $Al_2O_3$.

Boron oxide ($B_2O_3$) is also a glass-forming oxide that is used to reduce viscosity and thus improves the ability to melt and form glass. $B_2O_3$ can exist in either threefold or fourfold coordination in the glass network. Threefold coordinated $B_2O_3$ is the most effective oxide for reducing the Young's modulus and shear modulus, thereby improving the intrinsic damage resistance of the glass. A small amount of $B_2O_3$ decreases the softening point of the glass and, when ion exchanged, tends to increase compressive stress, but at the expense of DOL. The glasses described herein, in some embodiments, therefore comprise from about 0.5 mol % to about 4 mol % $B_2O_3$ and, in other embodiments, from about 0.5 mol % to about 2.5 mol % $B_2O_3$. The presence of both $B_2O_3$ and $P_2O_5$ in the glass enhances the mechanical performance of the glass by increasing the inherent damage resistance (IDR) of the glass. In some embodiments, $Al_2O_3$ (mol %)≥$B_2O_3$ (mol %).

The addition of $Li_2O$ lowers the softening point of the glass. When glasses having excessive amounts of $Li_2O$ are ion exchanged, the depth of the resulting compressive layer is relatively shallow. Accordingly, the glasses described herein comprise less than 1 mol % $Li_2O$ and, in some embodiments, are free of $Li_2O$.

$Na_2O$ is used to achieve chemical strengthening of the glass by ion exchange. The glasses described herein include $Na_2O$, which can be exchanged for potassium in a salt bath containing at least one potassium salt such as, for example, $KNO_3$. In some embodiments, the glass comprises from about 13 mol % to about 19 mol % $Na_2O$, in other embodiments, from about 13 mol % to about 17 mol % $Na_2O$, and, in still other embodiments, from about 15 mol % to about 19 mol % $Na_2O$.

In order to achieve sufficient depth of layer during ion exchange, the glass contains up to about 4 mol % of $K_2O$. In some embodiments, the glasses described herein comprise from about 0.3 mol % to about 4 mol % $K_2O$ and, in other embodiments, from about 1 mol % to about 4 mol % $K_2O$.

In order to achieve sufficiently low softening points, the ratio $R_2O$ (mol %)/$Al_2O_3$ (mol %), where $R_2O$=($Li_2O$+ $Na_2O$+$K_2O$+$Rb_2O$+$Cs_2O$), should be at least about 1.5 and in some embodiments, at least about 2 In some embodiments, $R_2O$ (mol %)/$Al_2O_3$ (mol %)≤4.

Phosphorous pentoxide ($P_2O_5$) is a network former incorporated in these glasses. $P_2O_5$ adopts a quasi-tetrahedral structure in the glass network; i.e., it is coordinated with four oxygen atoms, but only three of which are connected to the rest of the network. The fourth oxygen is a terminal oxygen that is doubly bound to the phosphorous cation. Association of boron with phosphorus in the glass network can lead to a mutual stabilization of these network formers in tetrahedral configurations, as with $SiO_2$. Like $B_2O_3$, the incorporation of $P_2O_5$ in the glass network is highly effective at reducing Young's modulus and shear modulus. Incorporating $P_2O_5$ in the glass network also reduces the high temperature CTE, increases the ion-exchange interdiffusion rate, and improves glass compatibility with zircon refractory materials. In some embodiments, the glasses described herein comprise from 0 mol % to about 3 mol % $P_2O_5$.

The presence of zirconia ($ZrO_2$) in the glass also enhances ion exchange. The glass may, in some embodiments, include from 0 mol % to about 4 mol % $ZrO_2$.

Alumina is partially replaced by MgO and ZnO in these glasses. The presence of at least one of MgO and ZnO also tends to increase the CS and DOL without increasing the softening point of the glass. In some embodiments, the glasses described herein comprise from about 1 mol % up to about 7 mol % ZnO and, in other embodiments, from about 4 mol % to about 7 mol % ZnO. In some embodiments, the glasses described herein comprise from 0 mol % to about 6 mol % MgO and, in certain embodiments from about 0.5 mol % to about 6 mol % MgO. In order to provide good devitrification performance, the glass, in some embodiments, includes both MgO and ZnO. In some embodiments, 1 mol %≤MgO (mol %)+ZnO (mol %)≤14 mol % and, in other embodiments, 4 mol %≤MgO (mol %)+ZnO (mol %)≤13 mol %.

In some embodiments, the base glasses described herein are meltable and may be formed by down-draw processes that are known in the art, such as slot-draw and fusion-draw processes. The glass compositions containing small concentrations of $Li_2O$, in some embodiments, have a zircon breakdown viscosity of less than about 30 kP and a liquidus viscosity of greater than about 150 kP. These glasses are therefore fully compatible with the fusion-draw process and can be manufactured without issue. The lithium can be batched as spodumene, petalite, feldspaths, lithium carbonate, or the like.

Compositions of non-limiting examples of the glasses described herein and comparative examples are listed in Table 1. Each of the glasses listed in Table 1 was prepared by melting 1000 g of raw materials in platinum crucible in an electric furnace. The melting cycle included: introducing the raw materials into the furnace, which was preheated at 1400° C.; heating the furnace and materials to 1600° C. in 120 min; a 240 minute hold at 1600° C.; pouring the glass melt; rolling the glass to a thickness of 4 mm; and annealing the rolled glass at 550° C.

TABLE 1

Compositions of glasses of the glasses described herein and comparative examples A and B, expressed in both mole percent and weight percent (wt %).

| | Sample | | | | | |
|---|---|---|---|---|---|---|
| | 1 | 2 | 3 | 4 | 5 | 6 |
| Composition (mol %) | | | | | | |
| $SiO_2$ | 65.4 | 69.4 | 65.4 | 66.4 | 66.3 | 66.3 |
| $Al_2O_3$ | 6.1 | 6.2 | 6.1 | 9.2 | 8.0 | 8 |
| $B_2O_3$ | 3 | 1 | 3 | 1 | 1.5 | 1.5 |
| $Li_2O$ | | | | | | |
| $Na_2O$ | 15.7 | 15.8 | 18.3 | 15.8 | 15.0 | 15 |
| $K_2O$ | 3.6 | 0.5 | 0.8 | 2 | 3.0 | 3 |
| MgO | 1 | 4.5 | 1 | 3 | 3.0 | 5 |
| ZnO | 2.4 | 2.5 | 2.4 | 2.5 | 3.0 | 1 |
| $P_2O_5$ | | | | | | |
| $ZrO_2$ | 2.9 | | 2.9 | | | |
| $SnO_2$ | 0.1 | 0.1 | 0.1 | 0.1 | 0.2 | 0.2 |
| MgO + ZnO | 3.4 | 7 | 3.4 | 5.5 | 6.0 | 6.0 |
| Composition (wt %) | | | | | | |
| $SiO_2$ | 58.82 | 66.21 | 59.74 | 61.34 | 61.18 | 61.96 |
| $Al_2O_3$ | 9.31 | 10.04 | 9.46 | 14.42 | 12.53 | 12.69 |
| $B_2O_3$ | 3.13 | 1.11 | 3.18 | 1.07 | 1.60 | 1.62 |
| $Li_2O$ | 0.00 | 0.00 | 0.00 | 0.00 | 0.00 | 0.00 |
| $Na_2O$ | 14.57 | 15.55 | 17.24 | 15.06 | 14.28 | 14.46 |
| $K_2O$ | 5.08 | 0.75 | 1.15 | 2.90 | 4.34 | 4.40 |
| MgO | 0.60 | 2.88 | 0.61 | 1.86 | 1.86 | 3.13 |
| ZnO | 2.92 | 3.23 | 2.97 | 3.13 | 3.75 | 1.27 |
| $P_2O_5$ | 0.00 | 0.00 | 0.00 | 0.00 | 0.00 | 0.00 |
| $ZrO_2$ | 5.35 | 0.00 | 5.43 | 0.00 | 0.00 | 0.00 |
| $SnO_2$ | 0.23 | 0.24 | 0.23 | 0.23 | 0.46 | 0.47 |

| | Sample | | | | | |
|---|---|---|---|---|---|---|
| | 7 | 8 | 9 | 10 | 11 | 12 |
| Composition (mol %) | | | | | | |
| $SiO_2$ | 64.8 | 66.3 | 66.3 | 65.05 | 67 | 66 |
| $Al_2O_3$ | 8 | 8.0 | 6 | 8.0 | 6.1 | 7 |
| $B_2O_3$ | 3 | 1.5 | 1.5 | 0.75 | 1 | 1 |
| $Li_2O$ | | | | | | |
| $Na_2O$ | 15 | 15 | 15 | 15.0 | 18 | 18 |
| $K_2O$ | 3 | 3.0 | 3 | 3.0 | 1.5 | 1.5 |
| MgO | 3 | 1.0 | 4 | 4.0 | 1 | 1 |
| ZnO | 3 | 5.0 | 4 | 4.0 | 2.4 | 2.4 |
| $P_2O_5$ | | | | | 1 | 1 |
| $ZrO_2$ | | | | | 2 | 2 |
| $SnO_2$ | 0.2 | 0.2 | 0.2 | 0.2 | 0.1 | 0.1 |
| MgO + ZnO | 6.0 | 6.0 | 8.0 | 8.0 | 3.4 | 3.4 |
| Composition (wt %) | | | | | | |
| $SiO_2$ | 59.67 | 60.42 | 61.96 | 60.08 | 60.87 | 59.68 |
| $Al_2O_3$ | 12.50 | 12.37 | 9.52 | 12.54 | 9.40 | 10.74 |
| $B_2O_3$ | 3.20 | 1.58 | 1.62 | | 1.05 | 1.05 |
| $Li_2O$ | 0.00 | 0.00 | 0.00 | 0.00 | 0.00 | 0.00 |
| $Na_2O$ | 14.25 | 14.10 | 14.46 | 14.29 | 16.87 | 16.79 |
| $K_2O$ | 4.33 | 4.29 | 4.40 | 4.34 | 2.14 | 2.13 |
| MgO | 1.85 | 0.61 | 2.51 | 2.48 | 0.61 | 0.61 |
| ZnO | 3.74 | 6.17 | 5.06 | 5.00 | 2.95 | 2.94 |
| $P_2O_5$ | 0.00 | 0.00 | 0.00 | 0.00 | 2.15 | 2.14 |
| $ZrO_2$ | 0.00 | 0.00 | 0.00 | 0.00 | 3.73 | 3.71 |
| $SnO_2$ | 0.46 | 0.46 | 0.47 | 0.46 | 0.23 | 0.23 |

TABLE 1-continued

Compositions of glasses of the glasses described herein and comparative examples A and B, expressed in both mole percent and weight percent (wt %).

| | Sample | | | | | | |
|---|---|---|---|---|---|---|---|
| | 13 | 14 | 15 | 16 | 17 | A | B |
| Composition (mol %) | | | | | | | |
| $SiO_2$ | 65.2 | 66.2 | 65.2 | 65.2 | 63.2 | 67.5 | 67.8 |
| $Al_2O_3$ | 10.2 | 9.2 | 10.2 | 9.2 | 10.2 | 5.9 | 10 |
| $B_2O_3$ | 1 | 1 | 1 | 2 | 2 | 0.44 | |
| $Li_2O$ | | | | | | 1.5 | |
| $Na_2O$ | 18.8 | 18.8 | 18.8 | 18.8 | 18.8 | 12.0 | 15 |
| $K_2O$ | 1.2 | 1.2 | 1.2 | 1.2 | 1.2 | 3.2 | 3 |
| MgO | 1 | 1 | 1 | 1 | 2 | 3.5 | 2 |
| ZnO | 2.5 | 2.5 | 2.5 | 2.5 | 2.5 | 5.5 | 2 |
| $P_2O_5$ | | | | | | | |
| $ZrO_2$ | | | | | | | |
| $SnO_2$ | 0.1 | 0.1 | 0.1 | 0.1 | 0.1 | 0.2 | 0.2 |
| MgO + ZnO | 3.5 | 3.5 | 3.5 | 3.5 | 4.5 | 9.0 | |
| Composition (wt %) | | | | | | | |
| $SiO_2$ | 59.68 | 60.98 | 59.68 | 59.98 | 57.94 | 63.40 | 61.92 |
| $Al_2O_3$ | 15.84 | 14.38 | 15.84 | 14.36 | 15.87 | 9.41 | 15.50 |
| $B_2O_3$ | 1.06 | 1.07 | 1.06 | 2.13 | 2.12 | 0.48 | 0.00 |
| $Li_2O$ | 0.00 | 0.00 | 0.00 | 0.00 | 0.00 | 0.70 | 0.00 |
| $Na_2O$ | 17.75 | 17.86 | 17.75 | 17.84 | 17.78 | 11.64 | 14.13 |
| $K_2O$ | 1.72 | 1.73 | 1.72 | 1.73 | 1.72 | 4.71 | 4.30 |
| MgO | 0.61 | 0.62 | 0.61 | 0.62 | 1.23 | 2.17 | 1.23 |
| ZnO | 3.10 | 3.12 | 3.10 | 3.12 | 3.10 | 7.01 | 2.47 |
| $P_2O_5$ | 0.00 | 0.00 | 0.00 | 0.00 | 0.00 | 0.00 | 0.00 |
| $ZrO_2$ | 0.00 | 0.00 | 0.00 | 0.00 | 0.00 | 0.00 | 0.00 |
| $SnO_2$ | 0.23 | 0.23 | 0.23 | 0.23 | 0.23 | 0.47 | 0.46 |

The glasses described herein may be formed into a three-dimensional shape using those means known in the art, including vacuum sagging, molding, or the like. Non-limiting examples of such three-dimensional shapes include those articles in which at least one surface has a dish-shaped, curved, convex, or concave profile. Dish-shaped articles may have a substantially flat portion bounded on at least one side by a curved portion. Non-limiting examples of dish-shaped glass ceramic articles are schematically shown in cross-sectional views in FIG. 1. Dish-shaped article 100 has two major surfaces 102, 104 each of which has a substantially flat or planar portion 110, bounded on either end (or, alternatively, on both ends) by a curved portion 120 to provide a dish-shaped profile or appearance. In other embodiments, dish-shaped article 130 has only one major surface 134 having a substantially flat or planar portion 110, bounded on either end (or, alternatively, on both ends) by a curved portion 120. The remaining major surface 132 is substantially flat or planar.

Ion exchange is widely used to chemically strengthen glasses. In one particular example, alkali cations within a source of such cations (e.g., a molten salt, or "ion exchange" bath) are exchanged with smaller alkali cations within the glass to achieve a layer that is under a compressive stress (CS) near the surface of the glass. The compressive layer extends from the surface to a depth of layer (DOL) within the glass. In the glasses described herein, for example, potassium ions from the cation source are exchanged for sodium ions within the glass during ion exchange by immersing the glass in a molten salt bath comprising a potassium salt such as, but not limited to, potassium nitrate ($KNO_3$). Other potassium salts that may be used in the ion exchange process include, but are not limited to, potassium chloride (KCl), potassium sulfate ($K_2SO_4$), combinations thereof, and the like.

Figure 2:
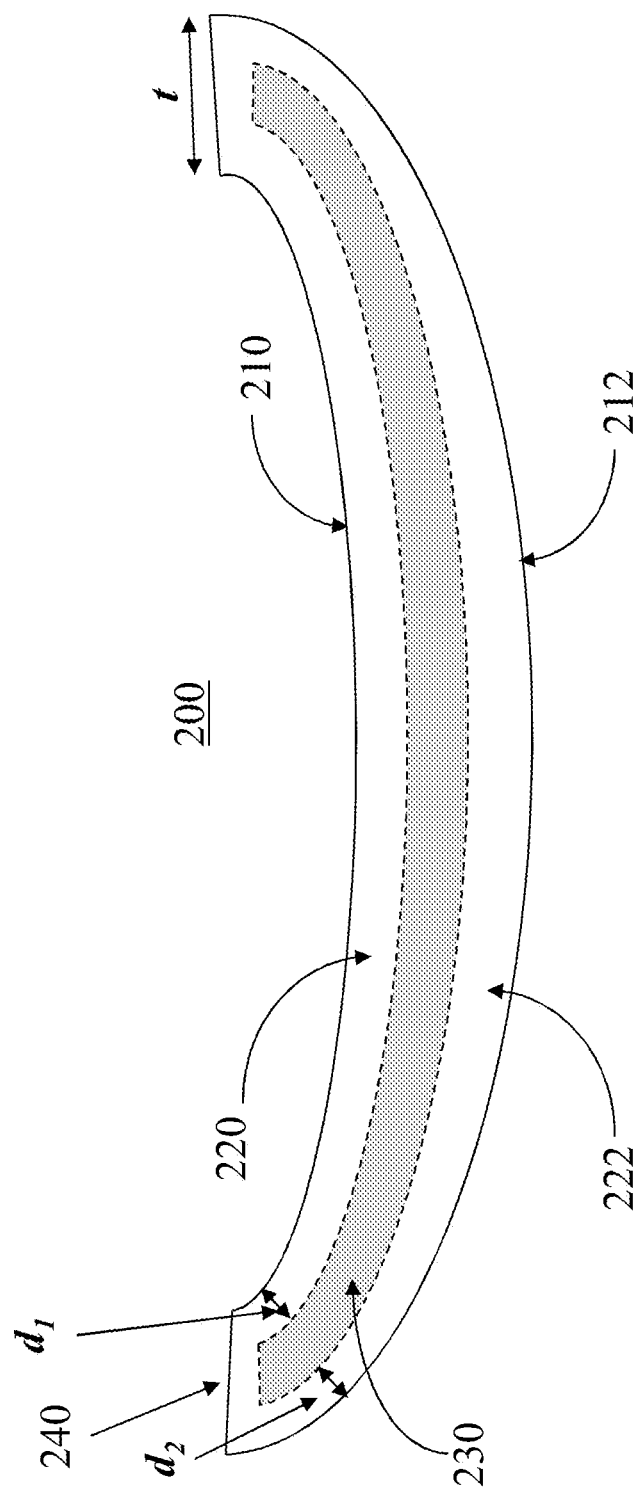
FIG. 2 is a cross-sectional schematic view of an ion exchanged three-dimensional glass article.

A cross-sectional schematic view of an ion exchanged curved, three-dimensional glass article is shown in FIG. 2. Three-dimensional glass article 200 has a thickness t, first surface 210, and second surface 212. Glass article 200 has a first compressive layer 220 extending from first surface 210 to a depth of layer $d_1$ into the bulk of the glass article 200. In the embodiment shown in FIG. 2, glass article 200 also has a second compressive layer 222 extending from second surface 212 to a second depth of layer $d_2$. Glass article also has a central region 230 that extends from $d_1$ to $d_2$. Central region 230 is under a tensile stress or central tension (CT), which balances or counteracts the compressive stresses of layers 220 and 222. The depth $d_1$, $d_2$ of first and second compressive layers 220, 222 protects the glass article 200 from the propagation of flaws introduced by sharp impact to first and second surfaces 210, 212 of glass article 200, while the compressive stress minimizes the likelihood of a flaw penetrating through the depth $d_1$, $d_2$ of first and second compressive layers 220, 222.

The glass articles described herein may be ion exchanged after being formed into a three-dimensional shape. In such instances, edges 240 joining first and second surfaces 210, 212 are ion exchanged as well, and have a surface layer under a compressive stress.

In some embodiments, the glasses described herein have a compressive layer having a maximum compressive stress CS of at least about 750 MPa and a depth of layer DOL of at least about 40 μm and, when ion exchanged at 410° C. in a molten potassium nitrate bath for about 10 hours or less. In other embodiments, a maximum CS of at least about 600 MPa, or at least about 650 MPa, and a DOL of at least about 50 μm is achieved after ion exchange at 410° C. for about 10 hours or less in a molten potassium nitrate bath. The maximum compressive stress is, in some embodiments, located at the surface of the glass and compressive layer. Other ion exchange times, ranging up to about 15 hours and temperatures, ranging from about 390° C. up to about 420° C., may be used to achieve similar results for these glasses. Non-limiting examples of such conditions are listed in Table 3.

The ion exchange bath may comprise 100%, or nearly 100% $KNO_3$ by weight. In some embodiments, the ion exchange bath may comprise least about 95% $KNO_3$ by weight and, in other embodiments, at least about 92% $KNO_3$ by weight. In certain embodiments, the ion exchange may be carried out in a mixed potassium/sodium bath such as, for example a $KNO_3/NaNO_3$ bath in which 20 wt %≤$NaNO_3$≤45 wt %.

Table 2 lists selected physical properties and compressive stresses and depths of layer obtained by ion exchange of the glasses listed in Table 1 at 410° C. for 10 hours in a molten bath comprising 100% potassium nitrate by weight. Table 3 lists additional results of ion exchange experiments performed on the glasses described herein.

TABLE 2

Physical properties, compressive stresses, and depths of layer of the glasses listed in Table 1.

| | Sample | | | | | |
|---|---|---|---|---|---|---|
| | 1 | 2 | 3 | 4 | 5 | 6 |
| Properties | | | | | | |
| Strain pt. (° C.) | 523 | 528 | 530 | 537 | | |
| Anneal pt. (° C.) | 565 | 570 | 571 | 580 | | |
| Softening pt. (° C.) (fiber) | | | | | 771 | 778 |
| Softening pt. (° C.) (PPV) | 754° C. | 772° C. | 756° C. | 789° C. | 777 | |
| HT CTE ($10^{-6}K^{-1}$) | 34 | 27.5 | 34.5 | 26.4 | | |
| LT CTE ($10^{-6}K^{-1}$) 25-300° C. | 9.3 | | 9.1 | | | |
| IOX conditions | 10 h 410° C. | 10 h 420° C. | 15 h 420° C. | 10 h 410° C. | 10 h 410° C. | 10 h 410° C. |
| CS (MPa) | 725 | 684 | 721 | 820 | 819 | |
| DOL (μm) | 42 | 40 | 44 | 45 | 47 | 50 |
| SOC (nm/cm · MPa) | 30.54 | 30.57 | 30.84 | 30.35 | 30.82 | |
| Viscosity: | | | | | | |
| A | | | | −1.763 | | |
| Bo | | | | 5633.4 | | |
| T | | | | 188.7 | | |
| Liquidus temp. (° C.) | <750 | 855 | <745 | 850 | | |

| | Sample | | | | | |
|---|---|---|---|---|---|---|
| | 7 | 8 | 9 | 10 | 11 | 12 |
| Properties | | | | | | |
| Strain pt. (° C.) | | 522 | 512 | | 515 | 525 |
| Anneal pt. (° C.) | | 567 | 555 | | 559 | 568 |

TABLE 2-continued

Physical properties, compressive stresses, and depths of layer of the glasses listed in Table 1.

| | | | | | | |
|---|---|---|---|---|---|---|
| Softening pt. (° C.) (fiber) | 753 | 771 | 781 | 787 | | |
| Softening pt. (° C.) (PPV) | 758 | 767 | | | 762 | 774 |
| HT CTE ($10^{-6}K^{-1}$) | 34 | 30 | 31 | | 29.3 | 29 |
| LT CTE ($10^{-6}K^{-1}$) 25-300° C. | | | | | 9.3 | 9.4 |
| IOX conditions | 10 h 410° C. | 10 h 410° C. | 10 h 410° C. | 10 h 410° C. | 10 h 410° C. | 10 h 410° C. |
| Cs (MPa) | 862 | 826 | 757 | 873 | 691 | 699 |
| DOL (μm) | 40 | 46 | 46 | 45 | 52 | >51 |
| SOC (nm/cm · MPa) | 30.87 | 31.78 | 30.88 | 30.97 | 30.29 | 30.42 |
| Viscosity: | | | | | | |
| A | | −2.25 | | | −2.164 | |
| Bo | | 6684.75 | | | 5835.7 | |
| T | | 67.20 | | | 167.6 | |
| Liquidus temp. (° C.) | 850 | | 815° C. | 845° C. | <720 | <755 |

| | Sample | | | | | | |
|---|---|---|---|---|---|---|---|
| | 13 | 14 | 15 | 16 | 17 | A | B |
| Properties | | | | | | | |
| Strain pt. (° C.) | 520 | 511 | 521 | 510 | 520 | | |
| Anneal pt. (° C.) | 564 | 555 | 565 | 522 | 562 | | |
| Softening pt. (° C.) (fiber) | | | | | | ~750° C. | 815 (BBV) |
| Softening pt. (° C.) (PPV) | 765 | 753 | 767 | 740 | 757 | | |
| HT CTE ($10^{-6}K^{-1}$) | | 29.5 | 28.5 | 33 | 30.3 | | |
| LT CTE ($10^{-6}K^{-1}$) 25-300° C. | 9.7 | 9.7 | 9.7 | 9.6 | 9.7 | | |
| IOX conditions | | 15 h 390° C. | 15 h 390° C. | 10 h 410° C. | 10 h 410° C. | 10 h 410° C. | 10 h 410° C. |
| Cs (MPa) | 721 | 687 | 770 | 685 | 759 | 811 | <666 |
| DOL (μm) | 48 | 43 | 42 | 46 | 43 | 30 | 95 |
| SOC (nm/cm · MPa) | 29.98 | 29.85 | 30.28 | 29.98 | 30.07 | 30.37 | |
| Viscosity: | | | | | | | |
| A | | | | | | ~750° C. | |
| Bo | | | | | | | |
| T | | | | | | | |
| Liquidus temp. (° C.) | <810 | 820 | <830 | 795 | <790 | | |

TABLE 3

Conditions used in ion exchange experiments conducted in a bath comprising 100% $KNO_3$ by weight, and CS and DOL values obtained for the glasses listed in Tables 1 and 2.

| | Sample | | | | | |
|---|---|---|---|---|---|---|
| | 1 | | 2 | | 3 | |
| SOC nm/cm · MPa | 30.54 | | 30.57 | | 30.84 | |
| IOX | CS (MPA) | DOL (μm) | CS (MPA) | DOL (μm) | CS (MPA) | DOL (μm) |
| 410° C./ 10 h | 725 | 42 | 730 | 36 | 759 | 37 |
| 410° C./ 15 h | 734 | 44 | 697 | 45 | 773 | 39 |
| 420° C./ 10 h | 770 | 36 | 684 | 40 | 806 | 31 |
| 420° C./ 15 h | 633 | 54 | 661 | 49 | 721 | 44 |
| 390° C./ 15 h | | | | | | |

TABLE 3-continued

Conditions used in ion exchange experiments conducted in a bath comprising 100% KNO$_3$ by weight, and CS and DOL values obtained for the glasses listed in Tables 1 and 2.

| | Sample | | |
|---|---|---|---|
| | 4 | 12 | 13 |
| SOC nm/cm · MPa | 30.35 | 30.29 | 30.42 |

| IOX | CS (MPA) | DOL (μm) | CS (MPA) | DOL (μm) | CS (MPA) | DOL (μm) |
|---|---|---|---|---|---|---|
| 410° C./10 h | 820 | 45 | 691 | 52 | 699 | 51 |
| 410° C./15 h | 789 | 55 | 738 | 38 | 760 | 40 |
| 420° C./10 h | 777 | 50 | | | | |
| 420° C./15 h | 743 | 61 | | | | |
| 390° C./15 h | | | | | | |

| | Sample | | |
|---|---|---|---|
| | 13 | 14 | 15 |
| SOC nm/cm · MPa | 29.98 | 29.85 | 30.28 |

| IOX | CS (MPA) | DOL (μm) | CS (MPA) | DOL (μm) | CS (MPA) | DOL (μm) |
|---|---|---|---|---|---|---|
| 410° C./10 h | 721 | 48 | 633 | 47 | 708 | 49 |
| 410° C./15 h | 689 | 60 | 613 | 59 | 678 | 57 |
| 420° C./10 h | 676 | 57 | 624 | 55 | 673 | 55 |
| 420° C./15 h | 658 | 71 | 579 | 65 | 641 | 66 |
| 390° C./15 h | | | 687 | 43 | 770 | 42 |

| | Sample | |
|---|---|---|
| | 16 | 17 |
| SOC nm/cm · MPa | 29.98 | 30.07 |

| IOX | CS (MPA) | DOL (μm) | CS (MPA) | DOL (μm) |
|---|---|---|---|---|
| 410° C./10 h | 685 | 46 | 759 | 43 |
| 410° C./15 h | 651 | 53 | 730 | 51 |
| 420° C./10 h | 636 | 48 | 715 | 49 |
| 420° C./15 h | 622 | 57 | 657 | 57 |
| 390° C./15 h | 756 | 36 | 827 | 37 |

The above glasses offer a good compromise in term of softening point, high temperature CTE, and, when ion exchanged, CS and DOL. The glasses described herein display the same ion exchange performance but have softening points that are at least about 50° C. lower than other alkali aluminosilicate glasses. Fining is efficiently achieved with a number of fining agents, including SnO$_2$. These glasses are of high quality, as they have very low concentrations of inclusions (e.g., "knots" and/or "stones") and blisters.

The glasses described herein, in either planar or three-dimensional configurations, may form at least a portion of a cover glass or housing of consumer electronic product such as phones, notebooks, entertainment devices, and the like. such products typically comprise: a housing having front, back, and side surfaces; electrical components that are at least partially internal to the housing and include at least a controller, a memory, and a display at or adjacent to the front surface of the housing; and a cover glass at or over the front surface of the housing such that covers the display. The cover glass and/or housing has a thickness of from about 0.25 mm, or from about 0.5 mm, up to about 1.0 mm, or up to about 2.0 mm, and may, in some embodiments, be strengthened by ion exchange.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure and appended claims.

The invention claimed is:

1. An alkali aluminosilicate glass, the alkali aluminosilicate glass comprising from 62 mol % to about 70 mol % SiO$_2$, from 0.75 mol % to 4 mol % B$_2$O$_3$, greater than 5 mol % Al$_2$O$_3$, MgO, and from about 1 mol % to about 7 mol % ZnO, wherein the alkali aluminosilicate glass is substantially free of Li$_2$O, wherein the alkali aluminosilicate glass has a softening point of 790° C. or less and a high temperature coefficient of thermal expansion of about 35×10$^{-6}$/K or less, and wherein the alkali aluminosilicate glass is formable into a three-dimensional non-planar shape, and is chemically strengthened and has a compressive layer extending to a depth of layer of at least about 40 μm from at least one surface of the alkali aluminosilicate glass into the alkali aluminosilicate glass.

2. The alkali aluminosilicate glass of claim 1, wherein the compressive layer has a maximum compressive stress of at least about 600 MPa.

3. The alkali aluminosilicate glass of claim 2, wherein the depth of layer is at least about 50 μm.

4. The alkali aluminosilicate glass of claim 2, wherein the maximum compressive stress is at least about 750 MPa.

5. The alkali aluminosilicate glass of claim 2, wherein the alkali aluminosilicate glass is ion exchanged for ten hours or less in a single ion exchange bath.

6. The alkali aluminosilicate glass of claim 2, wherein the alkali aluminosilicate glass comprises at least a portion of a cover glass or a housing of a consumer electronic product.

7. The alkali aluminosilicate glass of claim 6, wherein at least one of the cover glass and the housing has a thickness from about 0.25 mm to about 2.0 mm.

8. The alkali aluminosilicate glass of claim 1, wherein the alkali aluminosilicate glass comprises: from 62 mol % to about 70 mol % SiO$_2$; from greater than 5 mol % to about 11 mol % Al$_2$O$_3$; from 0.75 mol % to 4 mol % B$_2$O$_3$; less than 1 mol % Li$_2$O; from about 13 mol % to about 19 mol % Na$_2$O; from about 0.3 mol % to about 4 mol % K$_2$O; from greater than 0 mol % to about 6 mol % MgO; and from about 1 mol % to about 7 mol % ZnO.

9. The alkali aluminosilicate glass of claim 8, wherein the alkali aluminosilicate glass comprises: from about 64 mol % to about 67 mol % SiO$_2$; from greater than 5 mol % to about 10 mol % $Al_2O_3$; 0 mol % $Li_2O$; from about 13 mol % to about 17 mol % $Na_2O$; and from about 1 mol % to about 4 mol % $K_2O$.

10. The alkali aluminosilicate glass of claim 9, wherein the alkali aluminosilicate glass comprises from about 4 mol % to about 7 mol % ZnO.

11. The alkali aluminosilicate glass of claim 8, wherein the alkali aluminosilicate glass comprises from 0.75 mol % to 2.5 mol % $B_2O_3$ and from about 15 mol % to about 19 mol % $Na_2O$.

12. The alkali aluminosilicate glass of claim 8, comprising at least one of from 0 mol % to about 3 mol % $P_2O_5$ and from 0 mol % to about 4 mol % $ZrO_2$.

13. The alkali aluminosilicate glass of claim 8, wherein the alkali aluminosilicate glass comprises up to about 0.5 mol % of at least one of $SnO_2$ and $Sb_2O_3$.

14. The alkali aluminosilicate glass of claim 1, wherein $R_2O$ (mol %)/$Al_2O_3$ (mol %)≥1.5, where $R_2O$=($Li_2O$+$Na_2O$+$K_2O$+$Rb_2O$+$Cs_2O$).

15. The alkali aluminosilicate glass of claim 1, wherein the alkali aluminosilicate glass has a 200 poise temperature $T^{200}$ of 1620° C. or less.

16. The alkali aluminosilicate glass of claim 1, wherein the alkali aluminosilicate glass has a liquidus viscosity of at least 150 kP.

17. The alkali aluminosilicate glass of claim 1, wherein the alkali aluminosilicate glass has a zircon breakdown viscosity of less than 30 kP.

18. An alkali aluminosilicate glass, the alkali aluminosilicate glass comprising: from 62 mol % to about 70 mol % $SiO_2$; from greater than 5 mol % to about 11 mol % $Al_2O_3$; from 0.75 mol % to 4 mol % $B_2O_3$; from about 13 mol % to about 19 mol % $Na_2O$; from about 0.3 mol % to about 4 mol % $K_2O$; from greater than 0 mol % to about 6 mol % MgO; and from about 1 mol % to about 7 mol % ZnO, wherein the alkali aluminosilicate glass is substantially free of $Li_2O$, the alkali aluminosilicate glass having a softening point of 790° C. or less and a high temperature coefficient of thermal expansion of about 35×10$^{-6}$/K or less, and the alkali aluminosilicate glass is chemically strengthened and has a compressive layer extending to a depth of layer of at least about 40 μm from at least one surface of the alkali aluminosilicate glass into the alkali aluminosilicate glass.

19. The alkali aluminosilicate glass of claim 18, wherein the alkali aluminosilicate glass comprises: from about 64 mol % to about 67 mol % $SiO_2$; from greater than 5 mol % to about 10 mol % $Al_2O_3$; 0 mol % $Li_2O$; from about 13 mol % to about 17 mol % $Na_2O$; and from about 1 mol % to about 4 mol % $K_2O$.

20. The alkali aluminosilicate glass of claim 18, wherein the alkali aluminosilicate glass comprises from about 4 mol % to about 7 mol % ZnO.

21. The alkali aluminosilicate glass of claim 18, wherein the alkali aluminosilicate glass comprises from 0.75 mol % to 2.5 mol % $B_2O_3$ and from about 15 mol % to about 19 mol % $Na_2O$.

22. The alkali aluminosilicate glass of claim 18, comprising at least one of from 0 mol % to about 3 mol % $P_2O_5$ and from 0 mol % to about 4 mol % $ZrO_2$.

23. The alkali aluminosilicate glass of claim 18, wherein the alkali aluminosilicate glass comprises up to about 0.5 mol % of at least one of $SnO_2$ and $Sb_2O_3$.

24. The alkali aluminosilicate glass of claim 18, wherein $R_2O$ (mol %)/$Al_2O_3$ (mol %)≥1.5, where $R_2O$=($Li_2O$+$Na_2O$+$K_2O$+$Rb_2O$+$Cs_2O$).

25. The alkali aluminosilicate glass of claim 18, wherein the compressive layer has a maximum compressive stress of at least about 600 MPa.

26. The alkali aluminosilicate glass of claim 25, wherein the depth of layer is at least about 50 μm.

27. The alkali aluminosilicate glass of claim 25, wherein the maximum compressive stress is at least about 750 MPa.

28. The alkali aluminosilicate glass of claim 25, wherein the alkali aluminosilicate glass is ion exchanged for ten hours or less in a single ion exchange bath.

29. The alkali aluminosilicate glass of claim 25, wherein the alkali aluminosilicate glass comprises at least a portion of a cover glass or a housing of consumer electronic product.

30. The alkali aluminosilicate glass of claim 25, wherein at least one of the cover glass and the housing has a thickness from about 0.25 mm to about 1.0 mm.

31. The alkali aluminosilicate glass of claim 18, wherein the alkali aluminosilicate glass has a 200 poise temperature $T^{200}$ of 1620° C. or less.

32. The alkali aluminosilicate glass of claim 18, wherein the alkali aluminosilicate glass has a liquidus viscosity of at least 150 kP.

33. The alkali aluminosilicate glass of claim 18, wherein the alkali aluminosilicate glass has a zircon breakdown viscosity of less than 30 kP.

34. The alkali aluminosilicate glass of claim 18, wherein the alkali aluminosilicate glass is formable into a three-dimensional non-planar shape.

\* \* \* \* \*

UNITED STATES PATENT AND TRADEMARK OFFICE
CERTIFICATE OF CORRECTION

PATENT NO.        : 10,407,339 B2
APPLICATION NO.   : 15/052971
DATED             : September 10, 2019
INVENTOR(S)       : Marie Jacqeline Monique Comte et al.

It is certified that error appears in the above-identified patent and that said Letters Patent is hereby corrected as shown below:

In the Claims

In Column 14, Line 29, Claim 1, delete "$SiO_2$," and insert -- $SiO_2$; --, therefor.

In Column 14, Line 60-61, Claim 8, after "$B_2O_3$;" delete "less than 1 mol % $Li_2O$;".

Signed and Sealed this
Tenth Day of March, 2020

Andrei Iancu
*Director of the United States Patent and Trademark Office*